United States Patent Office 3,437,370
Patented Apr. 8, 1969

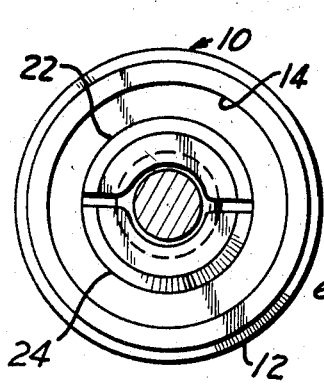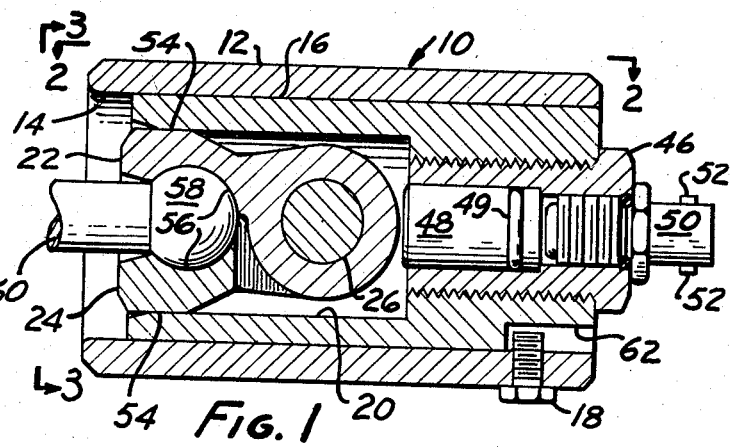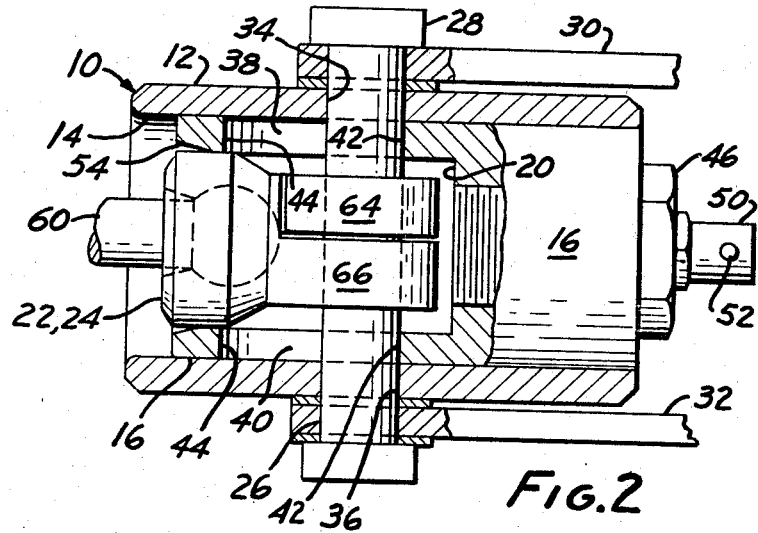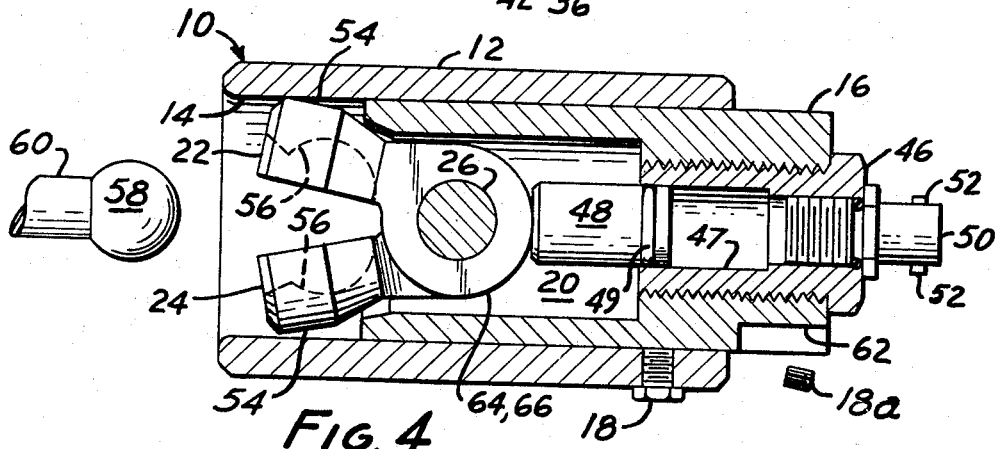
INVENTOR.
HARRY L. BOCHMAN, JR.
H. KEM THOMPSON
BY
ATTORNEYS.

1

3,437,370
RELEASE MECHANISMS
Harry L. Bochman, Jr., Seal Beach, and Hobert Kem Thompson, Saugus, Calif., assignors to Hi-Shear Corporation, Torrance, Calif., a corporation of California
Filed Aug. 14, 1967, Ser. No. 660,254
Int. Cl. B66f 17/00, 19/00; A44b 21/00
U.S. Cl. 294—83
12 Claims

ABSTRACT OF THE DISCLOSURE

The present disclosure relates to mechanisms for holding and releasing release bars.

A mechanism according to the present disclosure comprises a housing having a bore with a sleeve slidably mounted within said bore to move between first and second positions within the housing. A shaft is mounted to said housing and extends through the bore. Lock means, forming a socket having an opening, is rotatably mounted to the shaft in the bore to pivot between an open position for permitting passage of the head and shank of a release bar through the opening and a closed position for restraining the head of the release bar in the socket and permitting clearance for the shank of the release bar through the opening. Restraining means is provided for preventing the lock means from moving to its open position when the sleeve is in its first position. Means, such as a gas release device and a piston, is provided for moving the sleeve from its first to its second position thereby permitting the lock means to move from its closed to its open position so that the head of the release bar retained in the socket may be removed from said socket.

According to a preferred but optional feature of the present disclosure, a cam surface is provided on the lock means and is adapted to contact the piston whereby upon release of gas by the gas release device the piston moves the sleeve to its second position and reacts upon the cam surfaces to move the lock segments to their open position.

---

The present invention relates to release mechanisms for holding and releasing release bars, and particularly to release mechanisms adapted for use in marine environments.

Heretofore, release mechanisms have been inadequate for one reason or another for operation in marine environment. Prior art release mechanisms include several complex moving parts which, after being set in their locked condition, tend to stick or jam, thereby impeding or preventing release. Furthermore, prior release mechanisms commonly separate into two parts upon a release operation, one part being restrained while the other releases with the release bar. These release mechanisms are undesirable for use in a marine environment because, when reuse is desired, it is necessary to either recover both parts, or to provide replacement of that portion which is lost. Recovery of portions of a release mechanism from the bottom of a body of water may be quite expensive or impractical, especially in deep water. Furthermore, replacement of major portions of release mechanisms involves expensive supplying and storing of portions of the release mechanisms.

It is an object of the present invention to provide release mechanisms which are particularly adapted for use in marine environment, which have relatively few moving parts, and in which no major portion of the release mechanism must be separated from the release bar.

A release mechanism according to the present invention comprises a housing having a bore with a sleeve slidably mounted within the bore, to move between a first and a second position within the bore. Shaft means is mounted to said housing and extends through said bore. Lock means, forming a socket having an opening, is rotatably mounted to the shaft in the bore to move between an open position for permitting passage of the head and shank of the release bar through the opening and a closed position for restraining the head of the release bar in the socket and permitting clearance for the shank of the release bar through the opening. Restraining means is provided for preventing the lock means from moving to its open position when the sleeve is in its closed position. Means is provided for moving the sleeve from its first position to its second position to thereby permit the lock means to move from its closed position to its open position so that the head of a release bar retained in the socket may be removed from the socket.

According to an optional but desirable feature of the present invention, the moving means comprises an ordnance device having a gas release means and a piston.

According to another optional but desirable feature of the present invention, the gas release means is mounted within said sleeve and the piston is adapted to contact the lock means.

According to another optional but desirable feature of the present invention, the lock means is provided with a cam surface adapted to contact the piston whereby upon release of gas by the gas release means the piston moves the sleeve to its second position and reacts on the cam surface to move the lock means to its open position.

The above and other features of this invention will be more fully understood from the following detailed description and the accompanying drawings, in which:

FIG. 1 is a cutaway side view elevation of a release mechanism according to the present invention, holding a release bar, taken generally along the longitudinal axis;

FIG. 2 is a plan view partly in cutaway cross-section, taken at line 2—2 of FIG. 1;

FIG. 3 is a left end view elevation taken at line 3—3 of FIG. 1; and

FIG. 4 is a view similar to FIG. 1 with the device in its actuated condition.

In FIGS. 1–4 there is illustrated an ordnance-actuated release mechanism 10 according to the presently preferred embodiment of the present invention. Mechanism 10 comprises housing 12 having an axial bore 14. Sleeve 16 is slidably mounted within bore 14, and cavity 20 is formed within the sleeve.

Lock segments 22 and 24 are pivotally mounted to a shaft, such as the shank 26 of cross-bolt 28. As shown particularly in FIG. 2, cross-bolt 28 is mounted to suitable mounting brackets 30 and 32 and passes through holes 34 and 36 in housing 12 and through bore 14, preferably perpendicular to the axis of the bore. Slots 38 and 40 are provided in opposite walls of sleeve 16, and the shank of cross-bolt 28 passes through slots 38 and 40.

Plug 46 is threadedly mounted to sleeve 16 and closes one end of cavity 20. Plug 46 includes bore 47, and piston 48 is slidably mounted therein. A suitable O-ring seal 49 may be provided on piston 48 to provide a fluid-tight seal between piston 48 and bore 47. Ordnance device 50 or other suitable gas release means is threadedly mounted to plug 46 and is in fluid communication with piston 48. Suitable terminals 52 are provided for attaching electrical connectors to apply an electrical charge to ordnance device 50, thereby firing the same.

Lock segments 22 and 24 each include an exterior surface 54 adapted to be in contact with the interior wall of cavity 20 when the device is in a closed position, as shown in FIGS. 1 and 2, thereby preventing the lock segments from opening. Surfaces 56 on each of lock segments 22 and 24 cooperate to form a ball socket for partially enclosing ball head 58 of bar 60.

When the mechanism is in the position illustrated in FIGS. 1 and 2, the movement of sleeve 16 to the right (as shown in the drawings) is limited by shear bolt 18, and the movement of the sleeve to the left is limited by the contact position of face 42 of slots 38 and 40 with shank 26 of the cross-bolt.

To assemble release bar 60 to the release mechanism, shear bolt 18 is retracted from its locking position in slot 62 of sleeve 16 and sleeve 16 is moved to the left (as shown in the drawings). Sleeve 16 may be moved by any suitable means, such as by hand. Lock segments 22 and 24 are then moved to their open position, shown in FIG. 4, such as by pulling them apart manually, as bolt head 58 is placed in the open socket defined by surfaces 56. Sleeve 16 may then be returned to the position shown in FIGS. 1 and 2, thereby moving lock segments 22 and 24 to their closed position to retain ball head 58 in the socket defined by surfaces 56. Shear bolt 18 may then be threaded into place in slot 62 as shown in FIG. 1.

In operation, when the release mechanism is in its closed position, shown in FIGS. 1 and 2, axial tension forces applied to bar 60 are transmitted to the support brackets 30 and 32 by the lock segments 22 and 24 and cross-bolt 28. When it is desired to release bar 60 from the lock segments, ordnance device 50 is fired, thereby causing it to explode, and expanding gases from the explosion operate against piston 48 to tend to move piston 48 to the left (as shown in the drawings). However, piston 48 is prevented from movement due to lock segments 22 and 24 which are laterally restricted from moving by cross-bar 28 and mounting brackets 30 and 32. Sleeve 16, however, being slidably mounted within housing 12, moves to the right (as shown in the drawings). As sleeve 16 moves to the right, shear bolt 18 is sheared, and a portion 18a of the shear bolt (FIG. 4) is expelled from slot 62 which is formed in the sleeve. The sleeve moves to the right to its limiting position shown in FIG. 4 and defined by the size of slot 40, particularly by the contact position of face 44 of the slot and shank 28 of the cross-bolt. When sleeve 16 reaches the position shown in FIG. 4, the heads of segments 22 and 24 are permitted to pivot axially in opposite directions about the shank of cross-bolt 28 as the heads of the segments pass out of cavity 20. The scissor movement of lock segments 22 and 24 is aided by tension force on bar 60 and the camming reaction of ball head 58 on surfaces 56. The segments are thus permitted to pivot to the position illustrated in FIG. 4 wherein surfaces 54 are restricted only by the bore 14 of housing 12. The ball head 58 of bar 60 is then released from the socket and the bar 60 is released from the release mechanism.

To facilitate the rotational movement of segments 22 and 24, it is preferred that surfaces 64 and 66 of segments 22 and 24 be cammed so as so provide a radial opening force induced by the piston thrust.

The present invention thus provides a release mechanism for holding and releasing a release bar, which release mechanism is particularly adapted for use in marine environments. The device is simple to operate, has few moving parts, and is relatively free from maintenance problems. Furthermore, the device is fully recoverable from the marine environment by merely removing the housing; the sleeve, the ordnance device and the lock means all being retrieved with the housing.

What is claimed is:
1. A release mechanism for holding and releasing a release bar, which release bar has a head and a shank, said mechanism comprising: a housing having a bore; a sleeve slidably mounted within said bore between a first and a second position; shaft means mounted within said housing and extending through said bore; lock means comprising a plurality of lock segments forming a socket having an opening, said lock segments being mounted to said shaft means in said bore and adapted to scissor between an opening position for permitting passage of the head and shank of the release bar through said opening and a closed position for restraining the head of the release bar in said socket and permitting clearance for the shank of the release bar through said opening; restraining means for preventing the lock means from rotating to its open position when said sleeve is in its first position; and means for moving said sleeve from its first to its second position to thereby permit the lock means to rotate from its closed to its open position so that the head of a release bar retained in said socket may be removed from said socket.

2. A release mechanism according to claim 1 wherein said lock means comprises a pair of lock segments each having a surface defining a portion of said socket, whereby upon movement of said sleeve to its second position said lock segments are permitted to rotate in opposite directions about said shaft to their open position.

3. A release mechanism according to claim 2 wherein said socket is a ball socket adapted to restrain a ball head of a release bar, whereby upon movement of said sleeve from its first to its second position, tension force applied to said release bar causes the ball head to react on the surfaces of the ball socket to cam the lock segments to their open position.

4. A release mechanism according to claim 1 wherein said sleeve includes a cavity, said shaft means extending through said cavity, and the restraining means comprises a restraining surface on said lock means adapted to contact the wall of said cavity when the sleeve is in its first position, whereby when said sleeve is moved to its second position the restraining surface on said lock means is freed from said cavity.

5. A release mechanism according to claim 4 wherein said lock means comprises a pair of lock segments each having a surface defining a portion of said socket, whereby upon movement of said sleeve to its second position said lock segments are permitted to rotate in opposite directions about said shaft to their open position.

6. A release mechanism according to claim 5 wherein said sleeve includes a slot, said shaft extending through said slot, said slot defining the limits of movement of said sleeve in said bore.

7. A release mechanism according to claim 4 wherein said sleeve includes a slot, said shaft extending through said slot, said slot defining the limits of movement of said sleeve in said bore.

8. A release mechanism according to claim 1 wherein said means for moving said sleeve comprises gas release means and a piston in fluid communication with said gas release means.

9. A release mechanism according to claim 8 wherein said piston is slidably mounted within said sleeve and is adapted to contact said lock means and said gas release means is mounted to said sleeve in fluid communication with said piston.

10. A release mechanism according to claim 9 further including a cam surface on said lock means adapted to contact said piston whereby upon release of gas from said gas release means, said piston moves said sleeve to its second position and reacts on said cam surface to move said lock means to its open position.

11. A release mechanism according to claim 9 wherein said lock means comprises a pair of lock segments each having a surface defining a portion of said socket, whereby upon movement of said sleeve to its second position said lock segments are permitted to rotate in opposite directions about said shaft to their open position.

12. A release mechanism according to claim 11 wherein said socket is a ball socket adapted to restrain a ball head of a release bar, whereby upon movement of said sleeve from its first to its second position, tension force applied to said release bar causes the ball head to react on the surface of the ball socket to cam the lock segments to their open position.

References Cited

UNITED STATES PATENTS

| | | | |
|---|---|---|---|
| 3,071,404 | 1/1963 | Van Hove | 294—83 |
| 3,171,183 | 3/1965 | Johnston | 24—230.1 |
| 3,242,808 | 3/1966 | Nelson et al. | 294—83 |

ANDRES H. NIELSEN, *Primary Examiner.*

U.S. Cl. X.R.

24—230.9; 294—86.17